United States Patent Office 3,174,995

Patented Mar. 23, 1965

3,174,995

PRODUCTION OF UNSATURATED ESTERS

Thomas H. Cour, Austin, Tex., assignor to Jefferson Chemical Company, Inc., Houston, Tex., a corporation of Delaware No Drawing. Filed Sept. 16, 1963, Ser. No. 309,345
7 Claims. (Cl. 260—486)

This invention relates to an improved method for the production of unsaturated esters. More particularly, this invention relates to an improved method for the production of lower hydroxyalkyl methacrylates.

In copending Yeakey et al. application Serial No. 241,556, filed December 3, 1962 and entitled "Preparation of Esters," there is disclosed a method for the production of esters such as lower hydroxyalkyl methacrylates by the reaction of an epoxide such as propylene oxide, with an organic acid such as methacrylic acid in the presence of a catalytic amount of an alkali metal halide or alkaline earth metal halide. As is shown in the said application, the process disclosed and described therein can be used with generally satisfactory results for the preparation of 2-hydroxyalkyl methacrylates using lithium chloride in the reaction of methacrylic acid with an alkylene epoxide. Although the results obtained by this method are generally satisfactory, it has been discovered in accordance with the present invention that the crude reaction product is purified only with difficulty and that, moreover, the product even after purification frequently polymerizes on standing even though a suitable polymerization inhibitor such as 2,2′-methylene-bis(4-methyl-6-tert-butylphenol) is contained therein.

It has now been discovered in accordance with the present invention that these and related problems can be overcome by treating a freshly prepared crude lower hydroxyalkyl methacrylate product prepared by the lithium chloride catalyzed reaction of a lower alkylene epoxide with methacrylic acid with oxalic acid, oxydiacetic acid or adipic acid, followed by filtration of the thus-treated crude reaction product.

In particular, it has been discovered in accordance with the present invention that during the course of the esterification reaction, at least a portion of the lithium chloride is converted into a by-product such as lithium methacrylate and that this or other by-products so formed are only partially soluble in the crude reaction mixture whereby precipitation of a slimy, sludge-type material occurs. It has further been discovered, moreover, that the filtered product still contains a small but significant quantity of lithium sufficient in many instances to directly or indirectly induce autopolymerization of the ester reaction product.

Quite surprisingly, it has been discovered that the addition of from about 0.3 to about 3 mols of oxalic acid, adipic acid, oxydiacetic acid, or a mixture thereof, per mol of initially employed lithium chloride results in the formation of an easily filterable precipitate, and further results in the substantially complete removal of lithium from the reaction product.

The starting materials for the present invention are lithium chloride, a lower $C_2$ to $C_4$ alkylene epoxide (i.e., ethylene oxide, propylene oxide, 1,2-butylene epoxide, 2,3-butylene epoxide or isobutylene epoxide), methacrylic acid and oxalic acid, oxydiacetic acid, adipic acid, or a mixture thereof.

The methacrylic acid is reacted with the two to four carbon atom epoxide under appropriate reaction conditions such as a temperature within the range of about 50° to about 150° (more preferably, about 85° to 130° C.) in the presence of a catalytically effective amount of lithium chloride such as about 0.01 to about 1 mol of lithium chloride per mol of methacrylic acid. It is normally preferable to use a slight excess of propylene oxide in order to substantially completely convert the methacrylic acid. Although anhydrous reaction conditions can be employed if desired, this is not absolutely necessary and reasonable quantities of water may be present in the reaction mixture without adverse effect.

It is normally desirable to conduct the esterification reaction in the presence of a polymerization inhibitor of the conventional hindered phenol or copper-salt type, such as hydroquinone, di-tert-butyl-para-cresol, 4-methyl-6-tert-butylphenol, 2,2′-methylene-bis(4-methyl-6-tert-butylphenol) metallic copper, copper oleate, cuprous chloride, etc. The product formed by the reaction will normally comprise the 2-hydroxyalkyl methacrylate, unreacted epoxide and catalyst residue such as lithium chloride and lithium methacrylate. It may also contain methacrylic acid, alkylene chlorohydrin, dihydroxyalkyl methacrylate, dimethacrylate ester ester of the alkylene oxide and oxidation inhibitor.

There is no particular need to carefully monitor the acid number of the reaction mixture during the reaction, in that the final products will normally have acid numbers within the range of about 10 or less to 90.

At the conclusion of the reaction and after venting unreacted propylene oxide, if any, from about 0.3 to about 3 mols of oxalic acid, oxydiacetic acid, adipic acid, or a mixture thereof, per mol of lithium chloride is added to the crude reaction mixture with agitation. The crude reaction mixture is thereafter filtered. Preferably, the mixture is permitted to stand for an appropriate period of time such as from about 0.1 to about 2 hours, and is thereafter filtered whereby a substantially lithium-free lower hydroxyalkyl methacrylate product is formed which has significantly improved storage stability as compared with lower hydroxyalkyl methacrylates which has not been treated by the method of the present invention.

The invention will be further illustrated by the following specific examples, which are given by way of illustration and not as limitations on the scope of this invention.

EXAMPLE I 2-hydroxypropyl methacrylate was prepared by adding propylene oxide to about a 0.5 to 2 wt. percent solution of lithium chloride in methacrylic acid in a stirred batch reactor. The addition of propylene oxide not only resulted in the formation of 2-hydroxypropyl methacrylate, but also a slimy precipitate which could be removed by filtration only with difficulty.

In another run conducted in the above-described manner, one mol of oxalic acid per mol of lithium chloride was added to the crude reaction mixture after the addition of the propylene oxide was complete. A particularly easily filterable precipitate formed, and upon filtration of the crude reaction mixture, it was found that in excess of 95% of the lithium had been removed from the hydroxypropyl methacrylate product. The filtration was accomplished without difficulty. The addition of about 0.5 mol of oxalic acid per mol of lithium chloride resulted in the removal of in excess of 99% of the lithium initially present in the crude reaction mixture.

Similar results have been obtained in the production of 2-hydroxyethyl methacrylate by the lithium chloride catalyzed reaction of ethylene oxide with methacrylic acid followed by oxalic acid neutralization and filtration. This will also be the case when the epoxide is 2,3-butylene epoxide.

EXAMPLE II

In order to further demonstrate the effectiveness of the present invention, samples of a crude hydroxypropyl methacrylate reaction product which had been flashed for the removal of unreacted propylene oxide was treated by the addition of about 0.5 mol of oxalic acid per mol of lithium used in the esterification reaction, and the mixture was agitated for 15 minutes. Thereafter, one gram of filter aid was added and the resulting mixture was vacuum filtered through a Buchner funnel. It was found that the crude hydroxypropyl methacrylate contained about 1.9 wt. percent of lithium (calculated as lithium chloride), whereas the filtrate contained only about 0.03 wt. percent of lithium (calculated as lithium chloride). Thus, the removal of lithium chloride amounted to about 98.42%.

EXAMPLE III

About 100 gallons of a crude hydroxypropyl methacrylate product prepared in the manner of Example I was charged to an open top, stainless steel tank equipped with mixer, and about 28 pounds of a commercial grade oxalic acid and 5 pounds of a diatomaceous earth filter aid were charged. After about 0.5 hour of agitation, the mixture was filtered through a plate and frame filter press, the lithium content of the crude feed stock was about 1.09 wt. percent, while that of the filtrate was only about 40 p.p.m. In excess of about 99% of the lithium had been removed.

EXAMPLE IV 500 gram samples of crude hydroxypropyl methacrylate containing about 1.03 wt. percent of lithium (calculated as lithium chloride) were treated with various acids with agitation for about 15 minutes and then filtered. The results obtained are set forth in the following table:

*Table I*

| Precipitating agent | Mol/mol lithium | Initial lithium conc., percent as LiCl | Final lithium conc., percent as LiCl | Percent Removal of lithium | Remarks |
|---|---|---|---|---|---|
| Oxalic Acid | 0.53 | 1.9 | 0.03 | 98.42 | Easily filtered dry sludge. |
| Do | 1.01 | 1.09 | 0.004 | 99.63 | Do. |
| Phosphoric Acid | 0.48 | 1.9 | 0.08 | 95.80 | Very slimy ppt. Almost impossible to filter. |
| $NaH_2PO_4.H_2O$ | 0.59 | 1.9 | 0.81 | 57.50 | Do. |
| Sulfuric Acid | 0.61 | 1.03 | 0.320 | 69.00 | Wet sludge. |
| Citric Acid | 1.58 | 1.03 | 0.030 | 97.10 | Slimy slow filtering sludge. |
| Adipic Acid | 1.46 | 1.03 | 0.004 | 99.61 | Easily filtered dry sludge. |
| Oxalic Acid | 0.58 | 1.03 | 0.002 | 99.81 | Do. |
| Oxydiacetic Acid | 0.60 | 1.03 | 0.01 | 99.03 | Do. |

As can be seen from Table I, satisfactory results were obtained only with oxalic acid, adipic acid and oxydiacetic acid.

Having thus described my invention, what is claimed is:

1. In a method wherein a 2-hydroxyalkyl methacrylate is prepared by the reaction of an alkylene epoxide containing two to four carbon atoms with methacrylic acid in the presence of about 0.01 to about 1 mol of lithium chloride per mol of methacrylic acid to provide a crude reaction product comprising the corresponding 2-hydroxyalkyl methacrylate and lithium compounds, the improvement which comprises the steps of adding to said crude reaction mixture from about 0.3 to about 3 mols per mol of lithium chloride of a compound selected from the group consisting of oxalic acid, oxydiacetic acid, adipic acid, and mixtures thereof, and thereafter filtering the resultant mixture to obtain a substantially lithium-free 2-hydroxyalkyl methacrylate product.

2. A method as in claim 1 wherein the alkylene epoxide is ethylene oxide.

3. A method as in claim 2 wherein the compound is oxalic acid.

4. A method as in claim 1 wherein the alkylene epoxide is propylene oxide.

5. A method as in claim 4 wherein the compound is oxalic acid.

6. A method as in claim 4 wherein the compound is oxydiacetic acid.

7. A compound as in claim 4 wherein the compound is adipic acid.

References Cited in the file of this patent

UNITED STATES PATENTS

| | | |
|---|---|---|
| 2,089,569 | Orthner | Aug. 10, 1937 |
| 2,910,490 | Malkemus | Oct. 27, 1959 |
| 2,929,835 | Hayes | Mar. 22, 1960 |
| 3,059,024 | Goldberg | Oct. 16, 1962 |